(12) United States Patent
Stojanovski et al.

(10) Patent No.: US 11,743,231 B2
(45) Date of Patent: Aug. 29, 2023

(54) LOCAL AREA NETWORK (LAN) SERVICE IN FIFTH GENERATION (5G) SYSTEMS

(71) Applicant: Apple Inc., Cupertino, CA (US)

(72) Inventors: Alexandre Saso Stojanovski, Paris (FR); Ching-Yu Liao, Portland, OR (US); Meghashree Dattatri Kedalagudde, Portland, OR (US); Jerome Parron, Fuerth (DE); Puneet K. Jain, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/268,377

(22) PCT Filed: Aug. 12, 2019

(86) PCT No.: PCT/US2019/046187
§ 371 (c)(1),
(2) Date: Feb. 12, 2021

(87) PCT Pub. No.: WO2020/036882
PCT Pub. Date: Feb. 20, 2020

(65) Prior Publication Data
US 2021/0320897 A1    Oct. 14, 2021

Related U.S. Application Data

(60) Provisional application No. 62/718,270, filed on Aug. 13, 2018.

(51) Int. Cl.
*H04L 61/4541* (2022.01)
*H04W 4/50* (2018.01)
(Continued)

(52) U.S. Cl.
CPC ...... *H04L 61/4541* (2022.05); *H04L 61/4511* (2022.05); *H04W 4/50* (2018.02); *H04L 61/5007* (2022.05); *H04L 61/5014* (2022.05)

(58) Field of Classification Search
CPC ............. H04L 61/1541; H04L 61/1511; H04L 61/2007; H04L 61/2015; H04L 61/103; H04L 61/6022; H04W 4/50
See application file for complete search history.

(56) References Cited

U.S. PATENT DOCUMENTS 10,813,159 B2    10/2020  Kim et al.
2012/0303795 A1*  11/2012  Mo ................. H04L 41/5067
                                                        709/224
(Continued)

FOREIGN PATENT DOCUMENTS

WO    WO 2018-008927 A1    1/2018

OTHER PUBLICATIONS

International Search Report and Written Opinion of the International Searching Authority directed to related International Patent Application No. PCT/US2019/046187, dated Nov. 29, 2019, 10 pages.
(Continued)

*Primary Examiner* — Jimmy H Tran
(74) *Attorney, Agent, or Firm* — Sterne, Kessler, Goldstein & Fox P.L.L.C.

(57) ABSTRACT

Methods, systems, and storage media are described for providing fifth generation-local area network (5G LAN)-type services and 5G LAN communications over 5G Systems. Other embodiments may be described and/or claimed.

20 Claims, 12 Drawing Sheets

(51) Int. Cl.
  *H04L 61/4511* (2022.01)
  *H04L 61/5007* (2022.01)
  *H04L 61/5014* (2022.01)

(56) References Cited

U.S. PATENT DOCUMENTS

| | | |
|---|---|---|
| 2016/0142915 A1 | 5/2016 | Choyi et al. |
| 2017/0303259 A1 | 10/2017 | Lee et al. |
| 2017/0374614 A1 | 12/2017 | Lemieux |
| 2019/0075552 A1* | 3/2019 | Yu .................. H04W 24/10 |
| 2019/0254118 A1* | 8/2019 | Dao .................. H04L 67/141 |
| 2019/0306754 A1* | 10/2019 | Shan .................. H04W 8/06 |
| 2019/0342851 A1* | 11/2019 | Shan .................. H04W 12/06 |
| 2020/0045753 A1* | 2/2020 | Dao .................. H04W 76/10 |
| 2020/0084677 A1* | 3/2020 | Yiu .................. H04W 36/04 |
| 2020/0120475 A1* | 4/2020 | Gupta .................. H04W 8/06 |
| 2020/0220581 A1* | 7/2020 | Yiu .................. H04B 7/0695 |
| 2020/0228936 A1* | 7/2020 | Talebi Fard .......... H04W 8/186 |
| 2020/0329450 A1* | 10/2020 | Youn .................. H04W 68/005 |
| 2020/0336517 A1* | 10/2020 | Qiao .................. H04L 65/1073 |
| 2020/0404725 A1* | 12/2020 | Palat .................. H04W 76/15 |
| 2021/0014780 A1* | 1/2021 | Qiao .................. H04W 48/18 |
| 2021/0021437 A1* | 1/2021 | Qiao .................. H04W 8/02 |
| 2021/0029778 A1* | 1/2021 | Talebi Fard .......... H04W 8/08 |
| 2021/0058748 A1* | 2/2021 | Liao .................. H04W 76/11 |
| 2021/0084121 A1* | 3/2021 | Park .................. H04L 69/22 |
| 2021/0092668 A1* | 3/2021 | Zaus .................. H04W 60/00 |
| 2021/0226807 A1* | 7/2021 | Qiao .................. H04L 47/24 |
| 2021/0227561 A1* | 7/2021 | Talebi Fard .......... H04W 8/22 |
| 2021/0258828 A1* | 8/2021 | Qiao .................. H04L 69/04 |
| 2021/0329725 A1* | 10/2021 | Kawasaki ............ H04W 8/186 |
| 2022/0015190 A1* | 1/2022 | Jain .................. H04W 88/06 |
| 2022/0039177 A1* | 2/2022 | Talebi Fard .......... H04W 48/00 |
| 2022/0060970 A1* | 2/2022 | Zhu .................. H04W 40/30 |
| 2022/0268593 A1* | 8/2022 | Cabrero Barros ...... H04L 67/12 |

OTHER PUBLICATIONS

3GPP TR 22.821 V16.1.0, "3GPP; TSGSSA; Feasibility Study on LAN Support in 5G (Release 16)", Jun. 23, 2018.
3GPP TSG-SA WG2 Meeting No. 128, "support for 5GLAN communication service key issue," S2-187469, Item No. 6.15, Release No. 16, Jul. 2, 2018; 4 pages.

* cited by examiner

100

Retrieving, from memory, configuration parameters for configuring a user equipment (UE) for a fifth-generation (5G) local area network (LAN) service, wherein the configuration parameters include: a data network name (DNN) to access a private network and an authorized quality of service (QoS) parameter
105

Generating a message that includes the configuration parameters
110

Encoding the message for transmission to the UE via non-access stratum (NAS) signaling
115

Generating a message that includes configuration parameters to configure a user equipment (UE) for a fifth-generation (5G) local area network (LAN) service, wherein the configuration parameters include: a data network name (DNN) for accessing a private network and an authorized quality of service (QoS) parameter
305

Encoding the message for transmission to the UE via non-access stratum (NAS) signaling
310

FIG. 3

LOCAL AREA NETWORK (LAN) SERVICE IN FIFTH GENERATION (5G) SYSTEMS

CROSS REFERENCE TO RELATED APPLICATION

The present application is a U.S. National Phase of International Application No. PCT/US2019/046187, filed Aug. 12, 2019, which claims priority to U.S. Provisional Patent Application No. 62/718,270, filed Aug. 13, 2018, entitled "LOCAL AREA NETWORK SERVICE IN 5G SYSTEMS," the entire disclosures of which are hereby incorporated by reference in their entirety.

BACKGROUND

Among other things, embodiments of the present disclosure are directed to providing fifth generation-local area network (5G LAN)-type services and 5G LAN communications over 5G Systems. Some embodiments may operate in conjunction with external data networks.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1 and 2, and 3 illustrate examples of operation flow/algorithmic structures in accordance with some embodiments.

DETAILED DESCRIPTION

Figure 2:
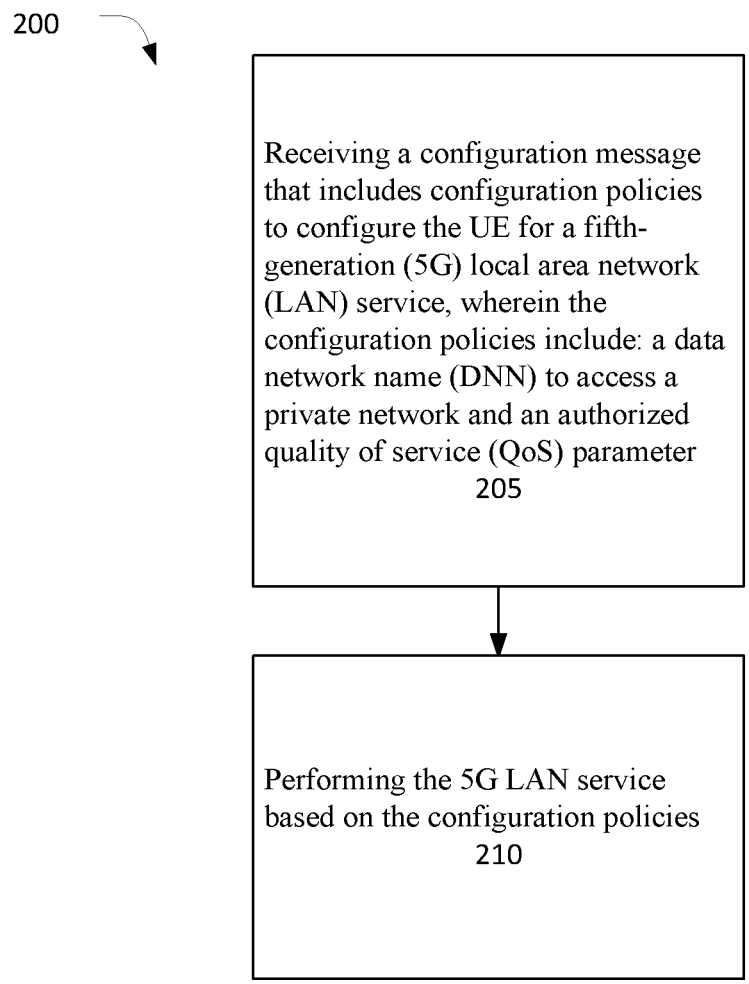

Embodiments discussed herein may relate to providing fifth generation-local area network (5G LAN)-type services and 5G LAN communications over 5G Systems. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

The 3rd Generation Partnership Project (3GPP) has started an architecture study on 5GS enhanced support of Vertical and LAN services (see 3GPP TR 23.734 v.0.1.0, 2018 Jul. 18).

As part of the study the following definitions have been agreed that are relevant for the present proposal:
  5GLAN Group: a set of UEs using private communication for 5G LAN-type service.
  5G LAN-type service: a service over the 5G system offering private communication using IP and/or non-IP type communications.
  private communication: a communication between two or more UEs belonging to a restricted set of UEs.
  5GLAN one to one communication: communication between two UEs in a 5GLAN group.
  5GLAN one to many communication: communication between one UE and many UEs in a 5GLAN group.

As part of the study the following relevant key issues have been agreed:

5.4 Key Issue #4: Support of 5G LAN-type service
  5.4.1 Key Issue #4.1: 5GLAN Group Management
  5.4.1.1 Description
Use cases are defined for 5G LAN-type service. For example, in the enterprise environment, equipment like smartphone, laptop may communicate with each other within a 5GLAN Group. The 5GLAN Group may be dynamically created by an operator or possibly requested by Application Function via service exposure.
This key issue 4.1 is to study:
  What is the system architecture and procedure supporting service exposure for creation and management of a 5GLAN Group?
  How the 5G system create a 5GLAN Group for private communication;
  How the 5G system identify a 5GLAN Group for private communication;
  How the UE is added into a 5GLAN Group, e.g. based on the request from an Application Function, including the authentication and authorization of UE to join a 5GLAN Group;
  How the 5G system remove a UE from a 5GLAN Group, e.g. based on the request from an Application Function;
  How the 5G system remove a 5GLAN Group.
  5.4.2 Key Issue #4.2: Service Discovery, Selection, and Restrictions
  5.4.2.1 General Description
The 5GLAN type services can span over wide area mobile network. This key issue aims at studying the mechanism in 5GS to enable the support for a UE to discover and select 5GLAN services and the mechanism for the 5GS to configure service restriction, e.g. based on location of a UE group membership, for a particular 5GLAN service.

The following open issues need to be studied:
  How to identify a 5GLAN service?
  Whether and how the 5GS network provide the required information to a UE and what the required information to support 5GLAN service discovery?
  What is the procedure and criteria for a UE to perform 5GLAN service discovery and selection?
  What is the granularity of 5GLAN service restriction, e.g. per UE, per 5GLAN group, per UE's location information, or other information and combination of such information?
  How does the 5GS network configure and enforce service restriction for a UE from 5GLAN?
  Whether and how does the 5GS network enforce respective service restrictions on a UE using multiple 5GLAN services without conflicts?

5.5 Key Issue #5: Support of 5GLAN Communication
  5.5.1 Description
Some standards documents may describe use cases and potential requirements for 5GLAN service, as well as normative requirements to support the Ethernet transport services of 5GLAN.

This key issue aims to provide solutions to support efficient 5GLAN communication, including IP-type 5GLAN communication and Ethernet-type 5GLAN communication, between two or more UEs within a 5GLAN group.

The following points should be studied:
  How to authorize a UE for 5GLAN communication.
  How to support service exposure function for AF managing 5GLAN communications.
  How to support the one to one or one to many data communication for 5GLAN communication service within a single 5GLAN group, the procedure to establish, modify, and release the one to one and one to many 5GLAN communication.
  How to know the UE reachability status for 5GLAN communication.
  How to keep the service continuity for 5GLAN communication due to UE mobility within the same PLMN.
  How to address the UE within the 5GLAN group for 5GLAN communication.
  How to ensure isolation of 5GLAN communication between 5GLAN groups.
  How to secure the 5GLAN one to one and one to many communication.
  Specifically, for Ethernet-type 5GLAN communication, following aspects are for study:
  How to support the Ethernet transport service of the 5GLAN group over wide area mobile network.
  How to route the Ethernet frames efficiently between UEs within a 5GLAN group.

Among other things, embodiments described herein are directed to providing 5G LAN-type service and 5GLAN communication over the 5G System. Some Embodiments may use the concept of interworking with external data networks for the 5GS and EPS, respectively. Embodiments provide a set of configuration parameters that is used to configure the UE and the network for 5G LAN-type service. The configuration parameters are distributed from the Policy and Charging Function (PCF) to the UE via NAS signalling.

The present disclosure may describe interworking with $3^{rd}$ party networks, where the term "$3^{rd}$ party network" is a service provided and operated by the Mobile Network Operator (MNO) itself. The configuration parameters for this operator service may be signaled to UE from the PCF.

According to various embodiments, a user goes to an operator's portal and makes a request for 5G LAN-type service. The request includes the GPSI (General Public Subscription Identifier) or SUPI (Subscriber Permanent Identity) of all users that are supposed to use this 5G LAN-type service for private communication and the type of communication (IP or Ethernet). In addition the user may indicate any of the following additional information: requested QoS, IPv4 or IPv6 communication, static or dynamic IP address, additional IP services (e.g. DNS, Dynamic DNS, DHCP, IMS, egress to Internet), additional Ethernet services (e.g. multiple IEEE 802.1Q VLANs, ARP). If the operator accepts the user request, the operator configures the network and the UE for 5G LAN-type service. The configuration is performed from a logical Application Function (AF) that configures the UE via the PCF directly (or via the NEF and then via PCF) and configures a selected PDU Session Anchor (PSA) manually or via the NEF and SMF. Without the embodiments herein, the 5G LAN-type service would have to be configured manually at the UE, which is a tedious process prone to errors.

The following process may be used for provision of 5G LAN-type service to a user, in accordance with various embodiments.

The user goes to the operator's portal and makes a request for 5G LAN-type service. The request includes the GPSI (General Public Subscription Identifier) or SUPI (Subscriber Permanent Identity) of all users that are supposed to use this 5G LAN-type service for private communication and the type of communication (IP or Ethernet). In addition the user may indicate any of the following additional information: requested QoS, IPv4 or IPv6 communication, static or dynamic IP address, additional IP services (e.g. DNS, Dynamic DNS, DHCP, IMS, egress to Internet), additional Ethernet services (e.g. multiple IEEE 802.1Q VLANs).

If the operator accepts the user request, the operator configures the network and the UE for 5G LAN-type service.

The configuration of the UE is performed from a logical Application Function (AF) that configures the UE via the PCF directly or indirectly via the NEF first and the PCF second. The direct path via the PCF is used in the case of requests targeting specific on-going PDU Sessions of individual UE(s), whereas the indirect path (NEF-PCF) is used for AF requests that target existing or future PDU Sessions of multiple UE(s). Eventually, the policy configuration is delivered from the PCF to the UE using the UE Configuration Update procedure.

The configuration of the network can be performed manually or via the NEF and the SMF. The configuration process comprises instantiating a private IP or Ethernet network by configuring a set of hardware and software resources (e.g. IP routers, DNS servers, DHCP servers, Ethernet switches, egress to internet, IMS servers, etc.) and configuring a selected PDU Session Anchor (PSA) as the ingress point to the 5GLAN.

Figure 4A:
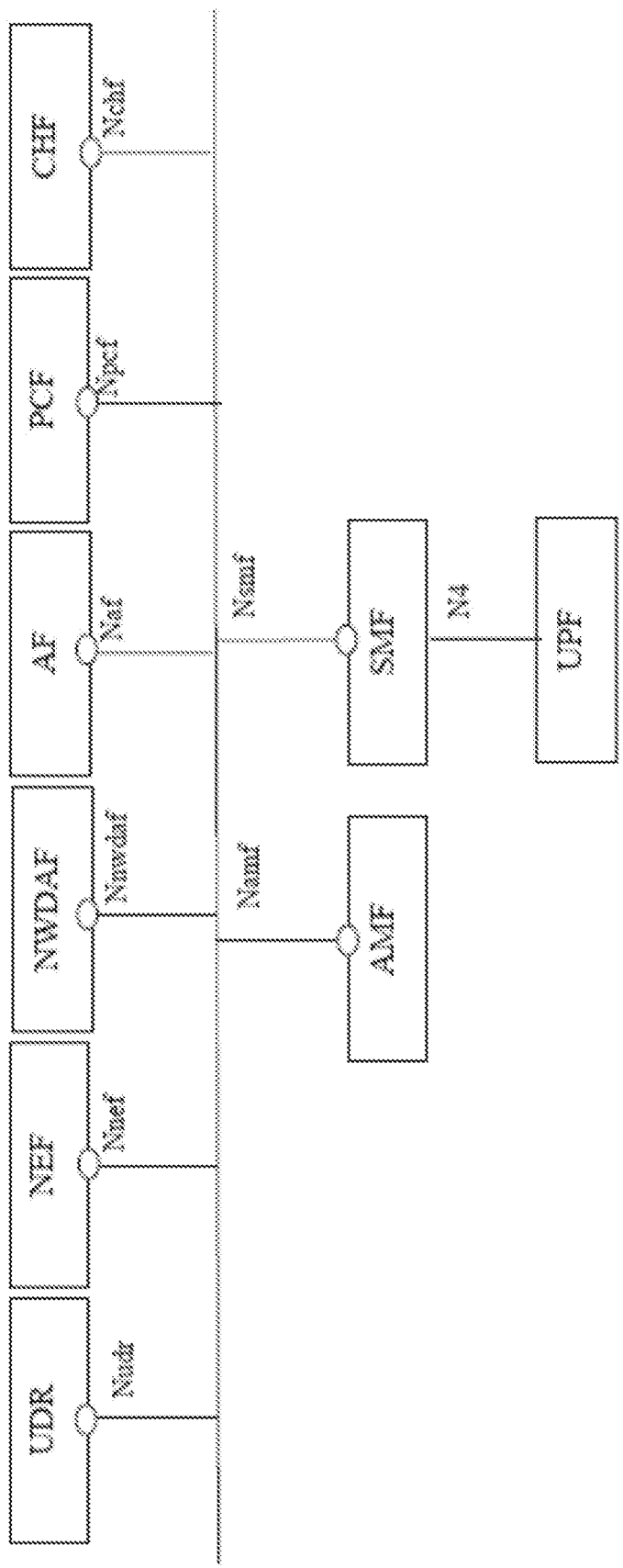
FIG. 4A illustrates an example of a service-based representation of a non-roaming reference architecture for a 5G system policy and charging control framework in accordance with some embodiments.
Figure 4B:
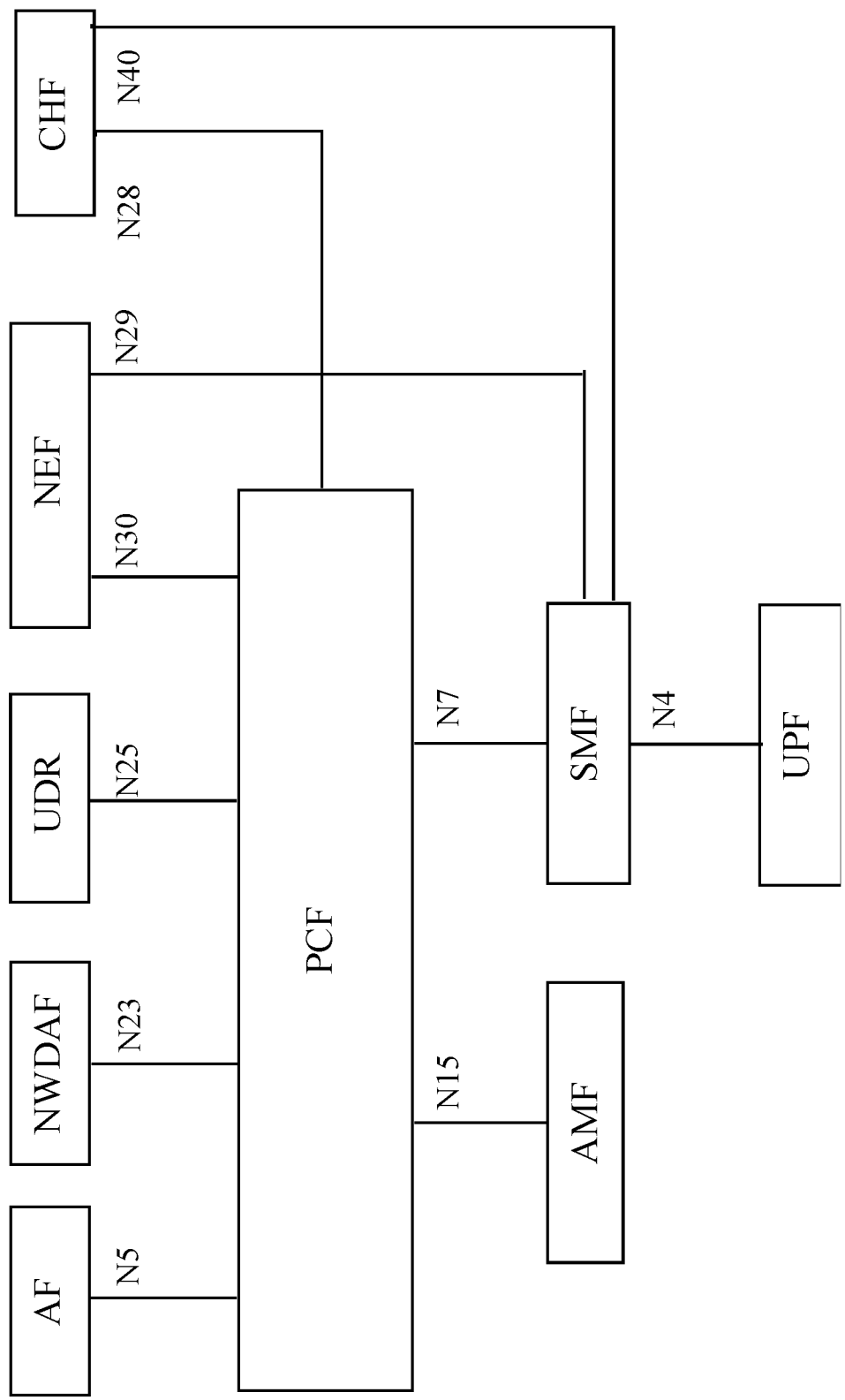
FIG. 4B illustrates an example of a reference point representation of a non-roaming reference architecture for a 5G system policy and charging control framework in accordance with some embodiments.

FIGS. 4A and 4B illustrate the overall architecture for the policy and charging framework in the 5G system in terms of both service-based and reference point representation. In particular, FIG. 4A shows an example of the service based representation and FIG. 4B shows an example of the reference point representation of the reference architecture of policy and charging control framework for the 5G System.

The reference architecture of the policy and charging control framework for the 5G Systems shown by FIGS. 4A and 4B comprises a Policy Control Function (PCF), a Session Management Function (SMF), a User Plane Function (UPF), an Access and Mobility Management Function (AMF), a Network Exposure Functionality (NEF), a Network Data Analytics Function (NWDAF), a Charging Function (CHF), an Application Function (AF), and a UDR (Unified Data Repository). The Nchf service for online and offline charging consumed by the SMF, and the Nchf service for Spending Limit Control consumed by the PCF.

Figure 4C:
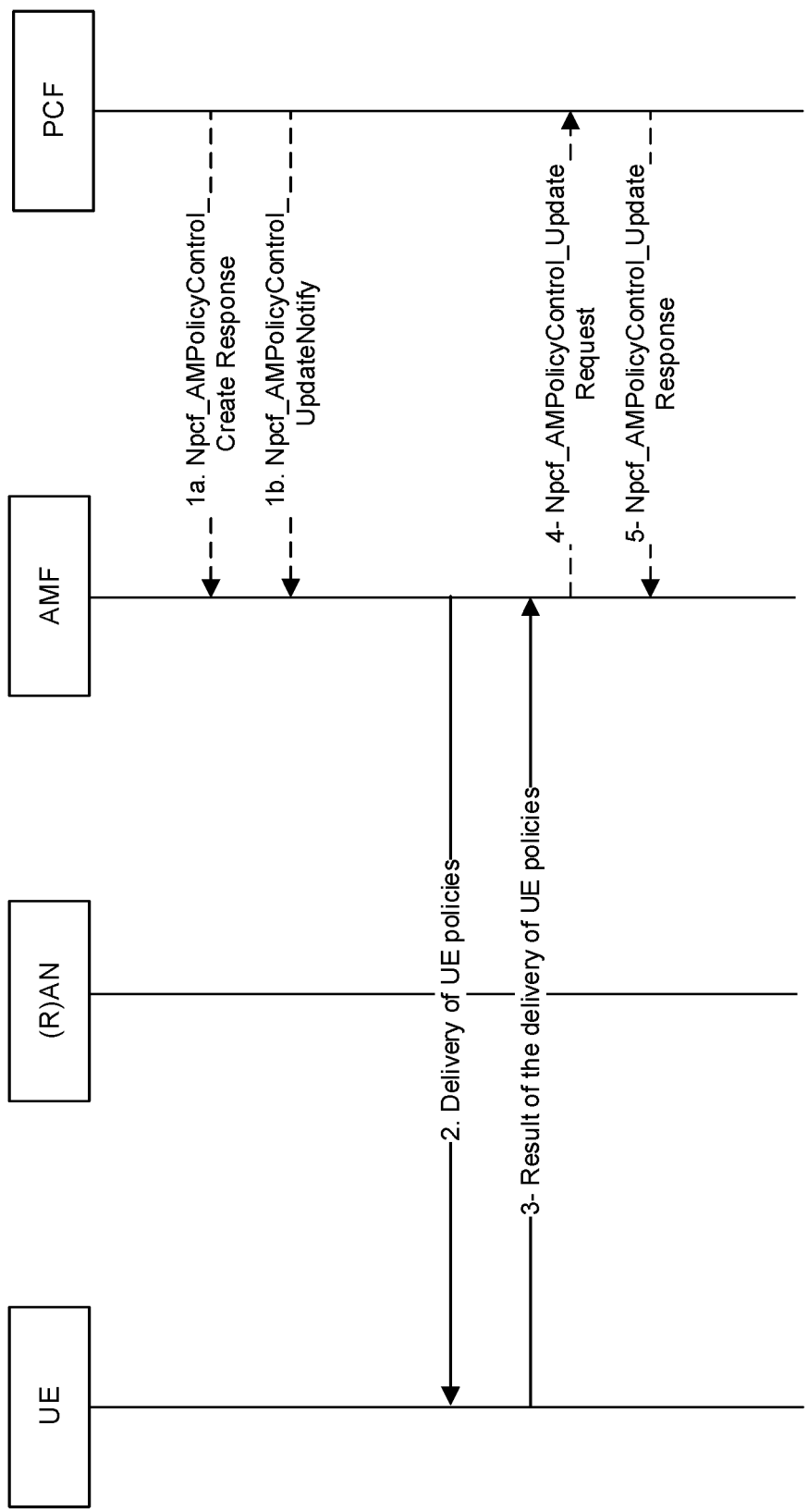
FIG. 4C illustrates an example of a UE configuration update procedure for transparent UE Policy delivery in accordance with some embodiments.

FIG. 4C shows an example UE Configuration Update procedure for transparent UE Policy delivery. FIG. 4C illustrates how UE policy can be delivered from the PCF to the UE by using the UE Configuration Update procedure. This procedure may operate as follows:

1a. As defined in clause 4.16.1.2, AMF may receive in the Npcf_AMPolicyControl_Create Response (Access and mobility related information or the UE Policy container (UE Access and PDU Session selection related information) or both) from the PCF.

1b. Alternately to 1a, as defined in clause 4.16.2.2, AMF receives in the Npcf_AMPolicyControl_UpdateNotify (Access and mobility related information or the UE Policy container (UE Access and PDU Session selection related information) or both) from the PCF.

2. If a UE is in CM-IDLE, the AMF triggers Network Triggered Service Request (in clause 4.2.3.3), if the UE is not reachable the AMF report to the PCF that the UE Policy container could not be delivered to the UE. If the UE is in CM-CONNECTED, the AMF transfers transparently the UE Policy container (UE Access and PDU session selection related information) received from the PCF to the UE. The UE Policy container includes the list of PSIs to notify the UE that one or more PSIs were added, removed or modified.

3. The UE performs the PSI operations and sends the result to the AMF. The AMF transfers transparently the result to the PCF. If one or several PSI operations failed the UE includes the UE Policy container (the list of stored PSIs).

4. If the AMF received the UE Policy container and the PCF subscribed to be notified of the reception of the UE Policy container then the AMF forwards the response of the UE to the PCF using Npcf_AMPolicyControl_Update including Information on the Policy Control Request Trigger condition that has been met "Policy container received" and EventInformation including the UE Policy container, 5. The PCF confirms the reception of the Npcf_AMPolicyControl_Update to the AMF.

The configuration information for 5G LAN-type service provided to the UE includes the following:

For 5G LAN-type service for IP communication:
DNN for access to the private network.
Credentials for authentication with the private network.
Authorised QoS (e.g. in terms of DSCPs or 5QIs).
IP address/prefix (in case of static IP address/prefix allocation).
DNS server name or address, and indication of support for dynamic DNS.
DHCP server address.
P-CSCF address (in case of enhanced services such as IMS).
Time of service activation.

For 5G LAN-type service for Ethernet communication:
DNN for access to the private network.
Indication of support of IEEE 802.1Q operation providing access to multiple virtual networks and QoS tagging support.
IEEE 802.1Q VID tags for virtual 802.1Q networks associated with this DNN.
List of GPSIs (or SUPIs) associated with each IEEE 802.1Q tag.

Authorised QoS (e.g. in terms of 5QIs or IEEE 802.1Q PCP values).

Indication of ARP (Address Resolution Protocol) support in the private network.

Indication of Spanning tree protocol support in the private network.

Max number of Ethernet addresses reachable via this UE.

Time of service activation.

Once the UE and the network are configured, the 5G LAN-type service largely follows the specification for access to external networks.

A UE wishing to connect to the private network makes a PDU Session Establishment request to the configured DNN. During PDU Session establishment, the network selects the preconfigured PDU Session Anchor (PSA) that is the ingress point to the preconfigured private network.

In case of IP communication, the interworking procedures are discussed in section 8 30 infra. In case of Ethernet communication, the interworking procedures are discussed in section 14 infra. If IEEE 802.1Q tags are used, the PSA selects the appropriate Ethernet VLAN based on the 802.1Q VID tag. If the DNN is configured for secondary (PDU Session-level) authentication, it is performed as specified in TS 33.501. For any enhanced services, such as IMS, the additional interworking procedures are discussed in section 13 infra.

The one-to-one and one-to-many communications are achieved by using native IP and Ethernet mechanisms. In all cases the transport between UE and the PSA is in point-to-point manner.

8 Interworking with DN (IP)

The 5GS supports interworking with DNs based on the Internet Protocol (IP) (e.g., either intranets or the Internet). When interworking with the IP networks, the 5GS can operate IPv4 and/or IPv6. Typically, in the IP networks, the interworking with subnetworks is done via IP routers. The N6 reference point is between the UPF and the external IP network. From the external IP network's point of view, the UPF is seen as a normal IP router. The L2 and L1 layers are operator specific. Interworking with user defined ISPs and private/public IP networks is subject to interconnect agreements between the network operators.

Figure 4D:
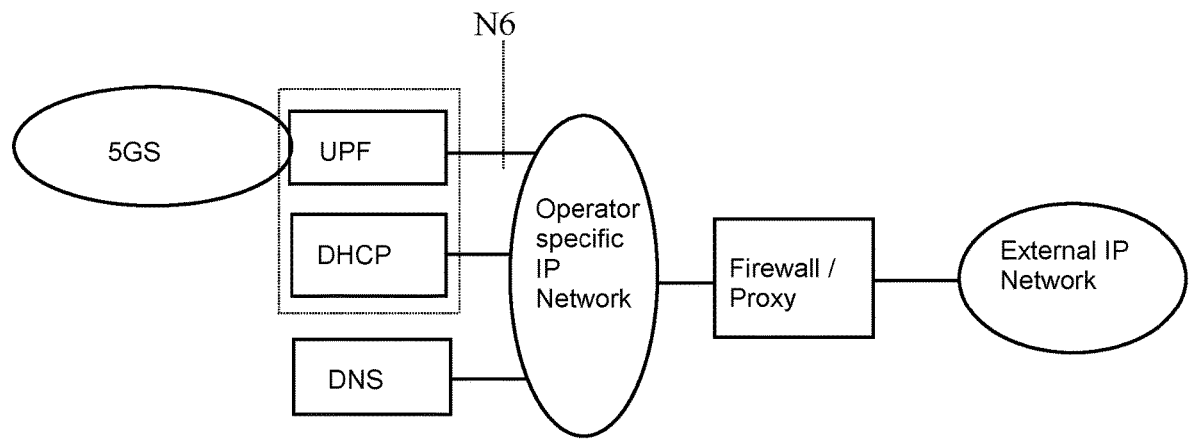
FIG. 4D illustrates an example of a data network (DN) interworking model for transparent access to the Internet in accordance with some embodiments.

FIG. 4D depicts an example DN interworking model for transparent access to the Internet is provided for an UPF in the 5GS and its N6 reference point.

In transparent access to the Internet case:

the UE is given an IPv4 address and/or an IPv6 prefix belonging to the operator addressing space. The IPv4 address and/or IPv6 prefix is assigned either at subscription in which case it is a static address or at PDU session establishment in which case it is a dynamic address. This IPv4 address and/or IPv6 prefix if applicable is used for packet forwarding between the Internet and the UPF and within the 5GS. With IPv6, Stateless Address Autoconfiguration shall be used to assign an IPv6 address to the UE. These procedures are as described in the IPv6 non-transparent access case except that the addresses belong to the operator addressing space.

the UE need not send any authentication request at PDU session establishment procedure and the SMF/UPF need not take any part in the user authentication/authorization process.

Figure 4E:
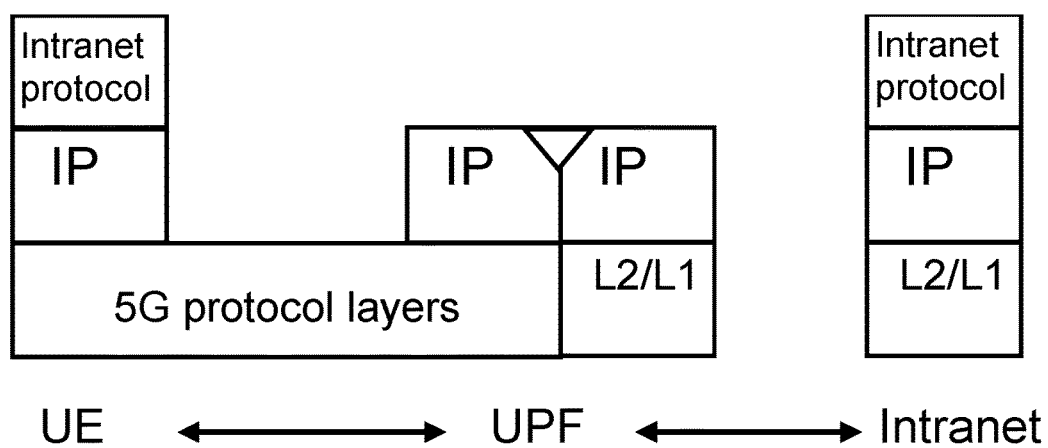
FIG. 4E illustrates an example of transparent access to an intranet in accordance with some embodiments.

The transparent case provides at least a basic ISP service. As a consequence of this it may therefore provide a QoS flow service for a tunnel to a private Intranet. The user level configuration may be carried out between the UE and the intranet, the 5GS is transparent to this procedure. The used protocol stack is depicted by FIG. 4E.

The communication between the PLMN and the Intranet may be performed over any network, even an insecure network e.g. the Internet. There is no specific security protocol between the UPF and the Intranet because security is ensured on an end to end basis between the UE and the intranet by the "Intranet Protocol".

User authentication and encryption of user data are done within the "Intranet Protocol" if either of them is needed. This "Intranet Protocol" may also carry private (IP) addresses belonging to the address space of the Intranet.

An example of an "Intranet Protocol" is IPsec (see IETF RFC 1825). If IPsec is used for this purpose, then IPsec authentication header or security header may be used for user (data) authentication and for the confidentiality of user data (see IETF RFC 1826 and IETF RFC 1827). In this case private IP tunneling within public IP takes place.

8.2 IPv4 Non-Transparent Access to DN

In this case:

a static or a dynamic IPv4 address belonging to the Intranet/ISP addressing space is allocated to a UE at PDU session establishment. Embodiments may utilize a variety of methods for allocating IP address to the UE. The allocated IPv4 address is used for packet forwarding within the UPF and for packet forwarding on the Intranet/ISP;

as a part of the PDU session establishment, the SMF may request user authentication from an external DN-AAA server (i.e. RADIUS, Diameter) belonging to the Intranet/ISP;

the IPv4 address allocation to the UE may be performed based on the subscription or a local address pool, which belongs to the Intranet/ISP addressing space, provisioned in the SMF; or via the address allocation servers (i.e. DHCPv4, RADIUS DN-AAA, Diameter DN-AAA) belonging to the Intranet/ISP;

if requested by the UE at PDU session establishment, the SMF may retrieve the Protocol Configuration Options or IPv4 configuration parameters from a locally provisioned database in SMF and/or from some external server (i.e. DHCPv4, RADIUS DN-AAA, Diameter DN-AAA) belonging to the Intranet/ISP;

the communication between the 5GS and the Intranet/ISP may be performed over any network, even an insecure network, e.g. the Internet. In case of an insecure connection between the UPF and the Intranet/ISP, there may be a specific security protocol in between. This security protocol is defined by mutual agreement between PLMN operator and Intranet/ISP administrator.

Table 8.2-1 summarizes the IPv4 address allocation and parameter configuration use cases between the UE and the SMF that may lead the SMF to interwork with the external DHCPv4, DN-AAA servers. For detailed description of the signalling flows between the UE and the SMF, see the references in the table.

TABLE 8.2-1

IPv4 address allocation and parameter configuration use cases

| | Signalling use cases between SMF and external servers | | |
|---|---|---|---|
| Signalling use cases between UE and SMF | Authentication via RADIUS or Diameter DN-AAA server (clauses 11 or 12) (NOTE 1 and NOTE 2) | IPv4 Address allocation via DHCPv4 or RADIUS or Diameter DN-AAA server (clauses 10, 11 or 12) (NOTE 1 and NOTE 2) | IPv4 parameter configuration via DHCPv4 or RADIUS or Diameter DN-AAA server (clauses 10, 11 or 12) (NOTE 1 and NOTE 2) |
| (1) IPv4 address allocation and parameter configuration via activation of QoS flow associated with the default QoS rule | X | X | X |
| (2) IPv4 address allocation and parameter configuration via DHCPv4 signalling from UE towards SME (NOTE 3) | | | |
| (3) IPv4 address allocation and parameter configuration in untrusted non-3GPP IP access | X | X | X |

NOTE 1:
When the SMF interworks with AAA servers, the DNN may be configured to interwork with either Diameter DN-AAA or RADIUS DN-AAA server.
NOTE 2:
If RADIUS DN-AAA or Diameter DN-AAA server is used, the authentication, IPv4 address allocation and parameter configuration signalling may be combined. Similarly, if DHCPv4 server is used for IPv4 address allocation and parameter configuration, the signalling towards the DHCPv4 server may be combined.
NOTE 3:
If the authentication and authorization procedure towards RADIUS DN-AAA or Diameter DN-AAA is required, it is performed by the SMF before the DHCPv4 signalling when it receives the initial access request (i.e. Nsmf_PDUSession_CreateSMContext).

8.3 IPv6 Non-Transparent Access to DN

When using IPv6 Address Autoconfiguration, the process of setting up the access to an Intranet or ISP involves two signalling phases. The first signalling phase is done in the control plane and consists of the PDU session establishment for 5GS 3GPP or non-3GPP based access, followed by a second signalling phase done in the user plane.

The user plane signalling phase shall be stateless. The stateless procedure, which involves only the UE and the SMF, is described in subclause 10.2.2.

For DNNs that are configured for IPv6 address allocation, the SMF shall only use the Prefix part of the IPv6 address for forwarding of mobile terminated IP packets. The size of the prefix shall be according to the maximum prefix length for a global IPv6 address.

The SMF indicates to the UE that Stateless Autoconfiguration shall be performed by sending Router Advertisements.

For UE supporting IPv6, IPv6 Stateless Address Autoconfiguration is mandatory.

In this case, the SMF provides the UE with an IPv6 Prefix belonging to the Intranet/ISP addressing space. A dynamic IPv6 address is given using stateless address autoconfiguration. This IPv6 address is used for packet forwarding within the UPF and for packet forwarding on the Intranet/ISP.

When an SMF receives an initial access request (i.e. Nsmf_PDUSession_CreateSMContext) message, the SMF deduces from local configuration data associated with the DNN:

The source of IPv6 Prefixes (SMF internal prefix pool, or external address allocation server);

Any server(s) to be used for address allocation, authentication and/or protocol configuration options retrieval (e.g. IMS related configuration);

The protocol, i.e. RADIUS, Diameter or DHCPv6, to be used with the server(s);

The communication and security feature needed to communicate with the server(s).

As an example, the SMF may use one of the following options:

SMF internal Prefix pool for IPv6 prefixes allocation and no authentication;

SMF internal Prefix pool for IPv6 prefixes allocation and RADIUS for authentication. The RADIUS DN-AAA server responds with either an Access-Accept or an Access-Reject to the RADIUS client in the SMF;

RADIUS for authentication and IPv6 prefix allocation. The RADIUS DN-AAA server responds with either an Access-Accept or an Access-Reject to the RADIUS client in the SMF.

The SMF includes the IPv6 address composed of a Prefix and an Interface-Identifier in the initial access response (Namf_Communication_N1N2MessageTransfer). The Interface-Identifier may have any value and it does not need to be unique within or across DNNs. It shall however not conflict with the Interface-Identifier that the SMF has selected for its own side of the UE-SMF link. The Prefix assigned by the SMF or the external DN-AAA server shall be globally or site-local unique (see the Note in subclause 11.3 of this document regarding the usage of site-local addresses).

Table 8.3-1 summarizes the IPv6 prefix allocation and parameter configuration use cases between the UE and the SMF that may lead the SMF to interwork with the external RADIUS DN-AAA, Diameter DN-AAA and DHCPv6 servers. This table also provides detailed descriptions of the signalling flows between the UE and the SMF.

TABLE 8.3-1

IPv6 prefix allocation and parameter configuration use cases

| | Signalling use cases between SMF and external servers | | |
|---|---|---|---|
| Signalling use cases between UE and SMF | Authentication via RADIUS or Diameter DN-AAA server (clauses 11 or 12) (NOTE 1 and NOTE 2) | IPv6 Prefix allocation via DHCPv6 or RADIUS or Diameter DN-AAA server (clauses 10, 11 or 12) (NOTE 1 and NOTE 2) | IPv6 parameter configuration via DHCPv6 or RADIUS or Diameter DN-AAA server (clauses 10, 11 or 12) (NOTE 1 and NOTE 2) |
| (1) IPv6 address allocation and parameter configuration | X | X | X |
| (2) IPv6 parameter configuration via stateless DHCPv6 | | | |
| (3) IPv6 address allocation and parameter configuration in untrusted non-3GPP IP access | X | X | X |

NOTE 1:
When the SMF interworks with DN-AAA servers, the DNN may be configured to interwork with either Diameter DN-AAA or RADIUS DN-AAA server.
NOTE 2:
If RADIUS DN-AAA or Diameter DN-AAA server is used, the authentication, IPv6 prefix allocation and parameter configuration signalling may be combined. Similarly, if DHCPv6 server is used for IPv6 address allocation and parameter configuration, the signalling towards the DHCPv6 server may be combined.

For IPv6 the PDU session establishment phase is followed by an address autoconfiguration phase. IPv6 prefix is delivered to UE in Router Advertisement message from the SMF which acts as an access router, in the process of IPv6 Stateless Address Autoconfiguration as described in subclause 10.2.2. Besides DHCPv6 protocol, the SMF may also use RADIUS or Diameter protocol for the retrieval of an IPv6 prefix from external DN.

13 Interworking with IMS 13.1 General

Interworking with the IP Multimedia Core Network Subsystem (IMS) puts specific requirements on the SMF.

The SMF shall use the following mechanisms to support the interworking with the IMS:
  the P-CSCF discovery;
  N7 interface for the policy and charging control of QoS flows for IMS media flows; and
  the P-CSCF restoration.

These mechanisms are however not restricted only to the interworking with the IMS and may be used for other services that could benefit from these mechanisms.

If the PDU Session is used for IMS (identified by DNN), the SMF shall not modify the fields Type of Service (IPv4) and Traffic Class (IPv6).

NOTE: The P-CSCF can support paging policy differentiation for different traffic or service types over NG-RAN by marking the fields Type of Service (IPv4) and Traffic Class (IPv6).

13.2 IMS interworking Model 13.2.1 Introduction

The signalling interface between the UE and the P-CSCF is a logical interface, i.e. it uses 5GC as a QoS flow. The Npcf_SMPolicyControl services, offered via N7 interface, are used for network communication between the SMF and the PCF.

13.2.2 IMS Specific Configuration in the SMF

The SMF shall have a list of preconfigured addresses of signalling servers (the P-CSCF servers). This list shall be provided to the UE at PDU session establishment. It shall be possible to preconfigure the list of preconfigured addresses of signalling servers per DNN.

The SMF/UPF may have the locally preconfigured packet filters, and/or the applicable PCC rules, to be applied on the QoS flow. The packet filters shall filter up-link and down-link packets, and shall only allow traffic to/from the signalling servers and to the DNS and the DHCP servers. It shall be possible to locally preconfigure the packet filters per DNN.

It shall be possible to enable/disable the use of the services offered via N7 interface per DNN.

The SMF shall support IPv4 and/or IPv6 addresses and protocol for IMS signalling and IMS QoS flows.

The methods for the UE to discover the P-CSCF address(es) may vary depending on the access technology that the UE is on. The P-CSCF discovery mechanisms are:
  a 5GC procedure for the P-CSCF discovery;
  via DHCP servers i.e. the SMF shall provide the functionality of a DHCP relay agent; and
  if the UE has a P-CSCF FQDN locally configured and request the DNS IP address(es) from the SMF (via 5GC mechanism or DHCP procedures), the SMF shall be able to provide DNS IP address(es) to the UE.

The SMF shall have similar functional support depending on the P-CSCF discovery methods supported by the UE on the access technology. For example, for the UE in 3GPP 5G access network the SMF shall have DHCP server function towards the UE while acting as a DHCP client towards external DHCP server, if the SMF is configured to request DNS and/or P-CSCF IP addresses from the external DHCP servers.

The SMF shall be able to deliver DNS and/or P-CSCF addresses to the UE if requested by the UE via the 5G network or via DHCP procedures using the relevant DHCP options for IPv4/IPv6 DNS and SIP servers.

On DNNs providing IMS services, the information advertised in Router Advertisements from the SMF to the UEs shall be configured in the same manner as for other DNNs providing IPv6 services except that the "O-flag" shall be set.

The "O-flag" shall be set in IPv6 Router Advertisement messages sent by the SMF for DNNs used for IMS services. This will trigger a DHCP capable UE to start a DHCPv6 session to retrieve server addresses and other configuration parameters. The UE which doesn't support DHCP shall ignore the "O-flag" and shall request the IMS specific configuration (e.g. the P-CSCF address) via other discovery methods supported in the UE (i.e. via locally configured P-CSCF address/FQDN in the UE or via 5G procedure, if applicable).

The SMF shall have configurable policy rules for controlling QoS flows used for signalling.

13.2.3 IMS Specific Procedures in the SMF 13.2.3.1 Provisioning of Signalling Server Address At a PDU Session establishment procedure related to the IMS, the SMF shall support the capability to send the P-CSCF address(es) to the UE. The P-CSCF address information is sent by the visited SMF if LBO is used. For Home routed, the P-CSCF address information is sent by the SMF in the HPLMN. The P-CSCF address(es) shall be sent transparently through the AMF, and in case of Home Routed also through the SMF in the VPLMN.

NOTE 1: The SMF is located in the VPLMN if LBO is used.

NOTE 2: Other options to provide the P-CSCF address(es) to the UE are not excluded.

NOTE 3: A PDU session for IMS is identified by "APN" or "DNN".

13.2.3.2 Failure of Signalling Server Address

If the SMF detects a failure upon receiving the N4 session report from the UPF for the monitored P-CSCF address being used by the UE; or upon receiving a P-CSCF restoration indication from the UDM or the PCF, then the SMF shall act as specified in 3GPP TS 23.380 v. 15.0.0, 2018 Jun. 18, subclause 5.8.

14 Interworking with DN (Ethernet)

Figure 4F:
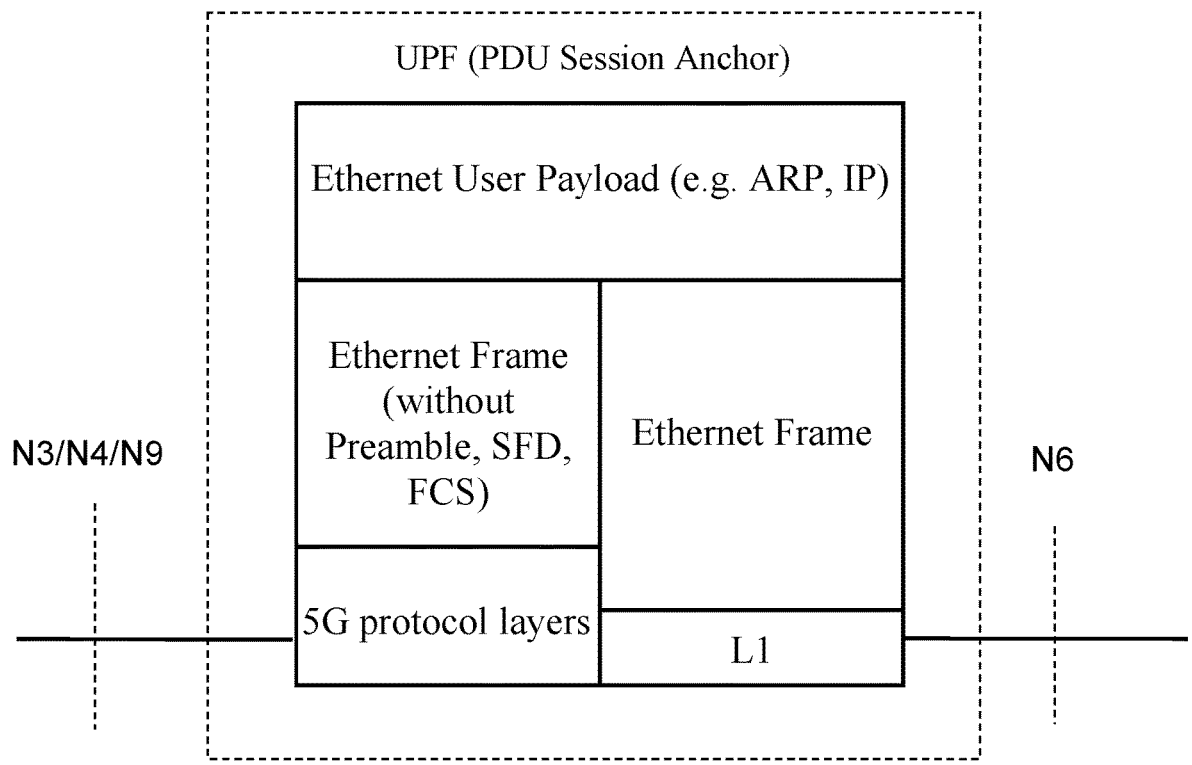
FIG. 4F illustrates an example of protocol stacks for Ethernet protocol data unit (PDU)-type data (user plane) for a N6 reference point in accordance with some embodiments.

Referring now to FIG. 4F, when support of Ethernet PDU type data is provided at the N6 interface, the SMF and UPF may support ARP proxying as specified in IETF RFC 1027 and/or IPv6 Neighbour Solicitation Proxying as specified in IETF RFC 4861 functionality. Based on operator configuration, during the PDU session establishment, the SMF may request the UPF acting as the PDU Session Anchor to proxy ARP/IPv6 Neighbour Solicitation or to forward the ARP/IPv6 Neighbour Solicitation traffic from the UPF to the SMF.

Ethernet Preamble, Start Frame Delimiter (SFD) and Frame Check Sequence (FCS) are not sent over 5GS:

For UL traffic the UE strips the Preamble, SFD and FCS from the Ethernet frame, those fields shall be added by the UPF acting as the PDU Session Anchor.

For DL traffic the UPF acting as the PDU Session Anchor shall strip the Preamble, SFD and FCS from the Ethernet frame.

IP address is not allocated by the SMF to the UE for this PDU Session. The UPF shall store the MAC addresses, received from the UE, and associate those with the appropriate PDU Session.

NOTE 1: The UE can operate in bridge mode with regard to a LAN it is connecting to the 5GS, thus different MAC addresses can be used as source address of different frames sent UL over a single PDU Session (and destination MAC address of different frames sent DL over the same PDU Session).

NOTE 2: Entities on the LAN connected to the 5GS by the UE can have an IP address allocated by the external DN, but the IP layer is considered as an application layer which is not part of the Ethernet PDU Session.

NOTE 3: In this Release of the specification, only the UE connected to the 5GS is authenticated, not the devices behind such UE.

When a PDU Session of Ethernet PDU type is authorized by a DN, the DN-AAA server may, as part of authorization data, provide the SMF with a list of allowed MAC addresses (maximum 16) for this PDU Session. When such a list has been provided for a PDU Session, the SMF sets corresponding filtering rules in the UPF(s) acting as PDU Session Anchor for the PDU Session and the UPF discards any UL traffic that does not contain any of these MAC addresses as a source address.

Figure 5:
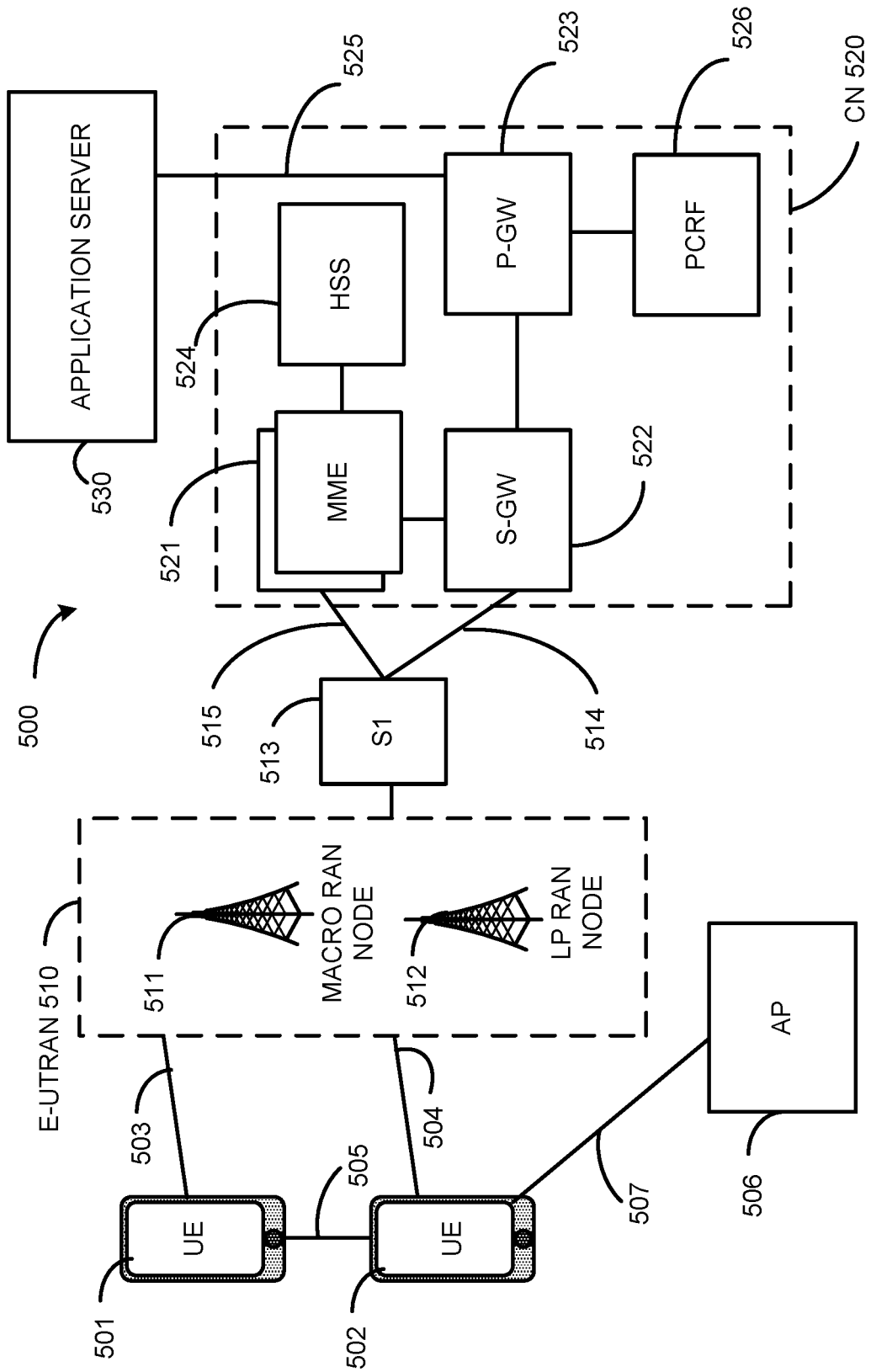
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment, the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate anew service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
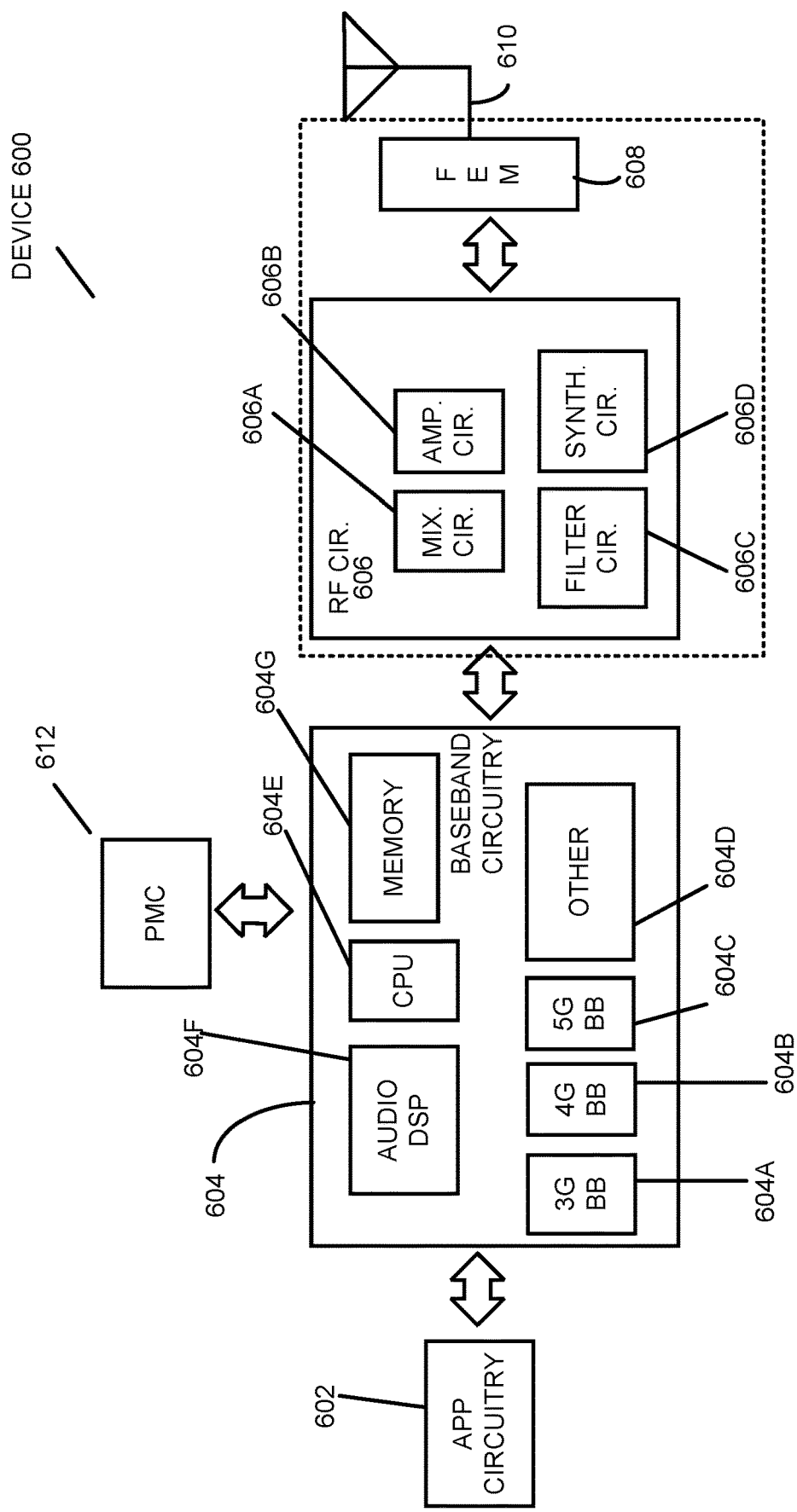
FIG. 6 depicts an example of components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606*a*, amplifier circuitry 606*b* and filter circuitry 606*c*. In some embodiments, the transmit signal path of the RF circuitry 606 may include filter circuitry 606*c* and mixer circuitry 606*a*. RF circuitry 606 may also include synthesizer circuitry 606*d* for synthesizing a frequency for use by the mixer circuitry 606*a* of the receive signal path and the transmit signal path. In some embodiments, the mixer circuitry 606*a* of the receive signal path may be configured to down-convert RF signals received from the FEM circuitry 608 based on the synthesized frequency provided by synthesizer circuitry 606*d*. The amplifier circuitry 606*b* may be configured to amplify the down-converted signals and the filter circuitry 606*c* may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606*a* of the receive signal path may comprise passive mixers, although the scope of the embodiments is not limited in this respect.

In some embodiments, the mixer circuitry 606*a* of the transmit signal path may be configured to up-convert input baseband signals based on the synthesized frequency provided by the synthesizer circuitry 606*d* to generate RF output signals for the FEM circuitry 608. The baseband signals may be provided by the baseband circuitry 604 and may be filtered by filter circuitry 606*c*.

In some embodiments, the mixer circuitry 606*a* of the receive signal path and the mixer circuitry 606*a* of the transmit signal path may include two or more mixers and may be arranged for quadrature downconversion and upconversion, respectively. In some embodiments, the mixer circuitry 606*a* of the receive signal path and the mixer circuitry 606*a* of the transmit signal path may include two or more mixers and may be arranged for image rejection (e.g., Hartley image rejection). In some embodiments, the mixer circuitry 606*a* of the receive signal path and the mixer circuitry 606*a* of the transmit signal path may be arranged for direct downconversion and direct upconversion, respectively. In some embodiments, the mixer circuitry 606*a* of the receive signal path and the mixer circuitry 606*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606*d* may be a fractional-N synthesizer or a fractional N/N+1 synthesizer, although the scope of the embodiments is not limited in this respect as other types of frequency synthesizers may be suitable. For example, synthesizer circuitry 606*d* may be a delta-sigma synthesizer, a frequency multiplier, or a synthesizer comprising a phase-locked loop with a frequency divider.

The synthesizer circuitry 606*d* may be configured to synthesize an output frequency for use by the mixer circuitry 606*a* of the RF circuitry 606 based on a frequency input and a divider control input. In some embodiments, the synthesizer circuitry 606*d* may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606*d* of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
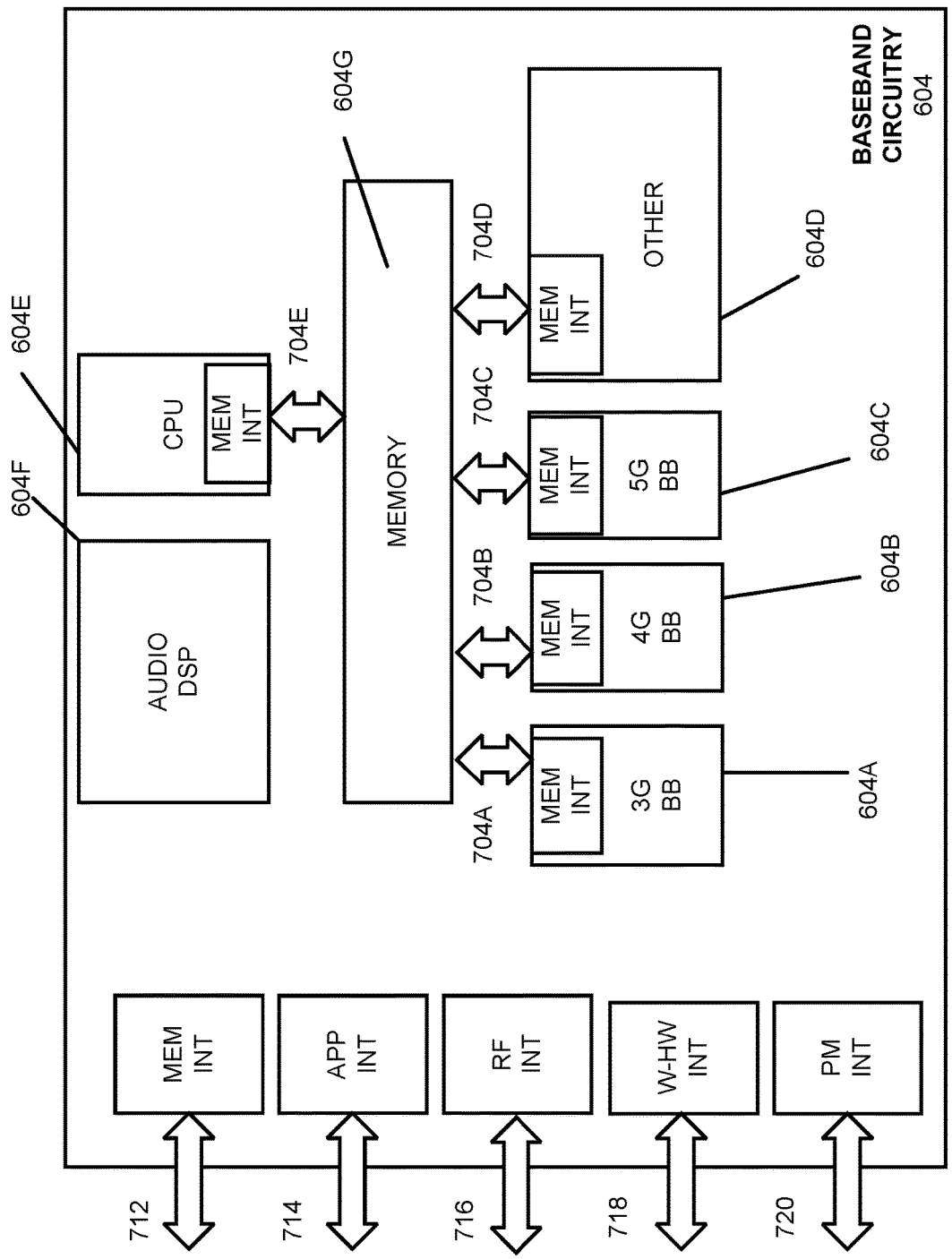
FIG. 7 depicts an example of interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
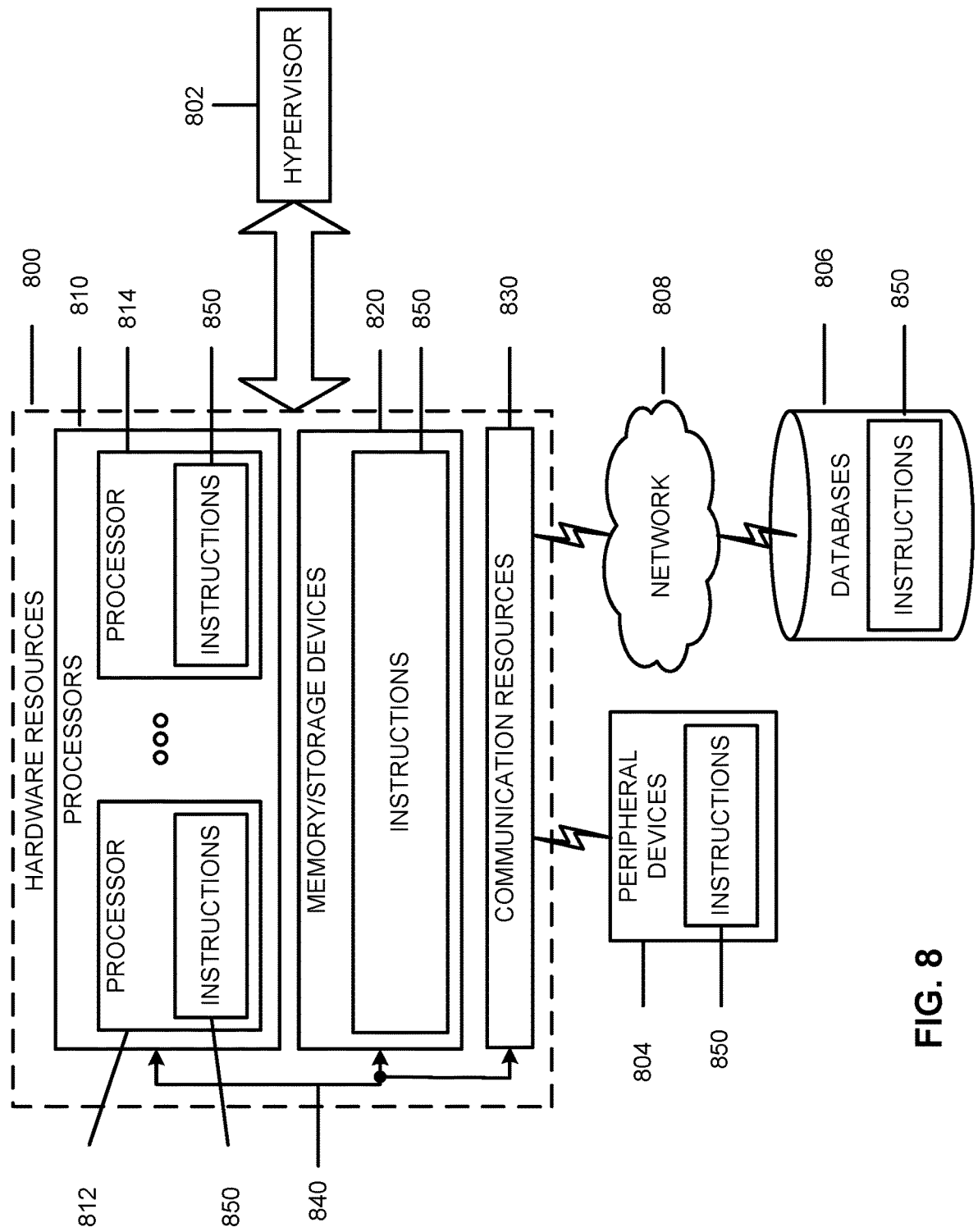
FIG. 8 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

In various embodiments, the devices/components of FIGS. 5-8, and particularly the baseband circuitry of FIG. 7, may be used to practice, in whole or in part, any of the operation flow/algorithmic structures depicted in FIGS. 1-3.

One example of an operation flow/algorithmic structure is depicted in FIG. 1, which may be performed by a next-generation NodeB (gNB) in accordance with some embodiments. In this example, operation flow/algorithmic structure 100 may include, at 105, retrieving, from memory, configuration parameters for configuring a user equipment (UE) for a fifth-generation (5G) local area network (LAN) service, wherein the configuration parameters include: a data network name (DNN) to access a private network and an authorized quality of service (QoS) parameter. Operation flow/algorithmic structure 100 may further include, at 110, generating a message that includes the configuration parameters. Operation flow/algorithmic structure 100 may further include, at 115, encoding the message for transmission to the UE via non-access stratum (NAS) signaling.

Another example of an operation flow/algorithmic structure is depicted in FIG. 2, which may be performed by UE in accordance with some embodiments. In this example, operation flow/algorithmic structure 200 may include, at 205, receiving a configuration message that includes configuration policies to configure the UE for a fifth-generation (5G) local area network (LAN) service, wherein the configuration policies include: a data network name (DNN) to access a private network and an authorized quality of service (QoS) parameter. Operation flow/algorithmic structure 200 may further include, at 210, performing the 5G LAN service based on the configuration policies.

Another example of an operation flow/algorithmic structure is depicted in FIG. 3, which may be performed by gNB in accordance with some embodiments. In this example, operation flow/algorithmic structure 300 may include, at 305, generating a message that includes configuration parameters to configure a user equipment (UE) for a fifth-generation (5G) local area network (LAN) service, wherein the configuration parameters include: a data network name (DNN) for accessing a private network and an authorized quality of service (QoS) parameter. Operation flow/algorithmic structure 300 may further include, at 310, encoding the message for transmission to the UE via non-access stratum (NAS) signaling.

EXAMPLES

Some non-limiting examples are provided below.

Example 1 includes 1 an apparatus comprising: memory to store configuration parameters for configuring a user equipment (UE) for a fifth-generation (5G) local area network (LAN) service, wherein the configuration parameters include: a data network name (DNN) to access a private network and an authorized quality of service (QoS) parameter; and processing circuitry, coupled with the memory, to: retrieve the configuration parameters from the memory; generate a message that includes the configuration parameters; and encode the message for transmission to the UE via non-access stratum (NAS) signaling.

Example 2 includes the apparatus of example 1 or some other example herein, wherein the configuration parameters further include a time of service activation.

Example 3 includes the apparatus of example 1 or some other example herein, wherein the configuration parameters are to configure the UE for a 5G LAN service for Internet protocol (IP) communication.

Example 4 includes the apparatus of example 3 or some other example herein, wherein the configuration parameters further include: credentials to authenticate with the private network, an IP address or prefix, a domain name service (DNS) server name or address, a support indicator for dynamic DNS, a dynamic host configuration protocol (DHCP) server address, or a proxy call session control function (P-CSCF) address.

Example 5 includes the apparatus of example 1 or some other example herein, wherein configuration parameters are to configure the UE for a 5G LAN service for Ethernet communication.

Example 6 includes the apparatus of example 5 or some other example herein, wherein the configuration parameters further include: an indication of support for an Institute of Electrical and Electronics Engineers (IEEE) 802.1Q operation to provide access to virtual networks and QoS support, an IEEE 802.1Q virtual LAN identifier (VID) tag for a virtual network associated with the DNN, a generic public subscription identifier (GPSI) or subscription permanent identifier (SUPI) associated with an IEEE 802.1Q tag, an indication of address resolution protocol (ARP) support in the private network, or a maximum number of Ethernet addresses reachable via the UE.

Example 7 includes the apparatus of example 1 or some other example herein, wherein the message is generated via a policy control function (PCF).

Example 8 includes one or more computer-readable media storing instructions that, when executed by one or more processors, cause a user equipment (UE) to: receive a configuration message that includes configuration policies to configure the UE for a fifth-generation (5G) local area network (LAN) service, wherein the configuration policies include: a data network name (DNN) to access a private network and an authorized quality of service (QoS) parameter; and perform the 5G LAN service based on the configuration policies.

Example 9 includes the one or more computer-readable media of example 8 or some other example herein, wherein the configuration policies further include a time of service activation.

Example 10 includes the one or more computer-readable media of example 8 or some other example herein, wherein the configuration policies are to configure the UE for a 5G LAN service for Internet protocol (IP) communication.

Example 11 includes the one or more computer-readable media of example 10 or some other example herein, wherein the configuration policies further include: credentials to authenticate with the private network, an IP address or prefix, a domain name service (DNS) server name or address, a support indicator for dynamic DNS, a dynamic host configuration protocol (DHCP) server address, or a proxy call session control function (P-CSCF) address.

Example 12 includes the one or more computer-readable media of example 8 or some other example herein, wherein configuration policies are to configure the UE for a 5G LAN service for Ethernet communication.

Example 13 includes the one or more computer-readable media of example 12 or some other example herein, wherein the configuration policies further include: an indication of support for an Institute of Electrical and Electronics Engineers (IEEE) 802.1Q operation to provide access to virtual networks and QoS support, an IEEE 802.1Q virtual LAN identifier (VID) tag for a virtual network associated with the DNN, a generic public subscription identifier (GPSI) or subscription permanent identifier (SUFI) associated with an IEEE 802.1Q tag, an indication of address resolution protocol (ARP) support in the private network, or a maximum number of Ethernet addresses reachable via the UE.

Example 14 includes one or more computer-readable media storing instructions that, when executed by one or more processors, cause a next-generation NodeB (gNB) to: generate a message that includes configuration parameters to configure a user equipment (UE) for a fifth-generation (5G) local area network (LAN) service, wherein the configuration parameters include: a data network name (DNN) for accessing a private network and an authorized quality of service (QoS) parameter; and encode the message for transmission to the UE via non-access stratum (NAS) signaling.

Example 15 includes the one or more computer-readable media of example 14 or some other example herein, wherein the configuration parameters further include a time of service activation.

Example 16 includes the one or more computer-readable media of example 14 or some other example herein, wherein the configuration parameters are to configure the UE for a 5G LAN service for Internet protocol (IP) communication.

Example 17 includes the one or more computer-readable media of example 16 or some other example herein, wherein the configuration parameters further include: credentials to authenticate with the private network, an IP address or prefix, a domain name service (DNS) server name or address, a support indicator for dynamic DNS, a dynamic host configuration protocol (DHCP) server address, or a proxy call session control function (P-CSCF) address.

Example 18 includes the one or more computer-readable media of example 14 or some other example herein, wherein configuration parameters are to configure the UE for a 5G LAN service for Ethernet communication.

Example 19 includes the one or more computer-readable media of example 18 or some other example herein, wherein the configuration parameters further include: an indication of support for an Institute of Electrical and Electronics Engineers (IEEE) 802.1Q operation to provide access to virtual networks and QoS support, an IEEE 802.1Q virtual LAN identifier (VID) tag for a virtual network associated with the DNN, a generic public subscription identifier (GPSI) or subscription permanent identifier (SUPI) associated with an IEEE 802.1Q tag, an indication of address resolution protocol (ARP) support in the private network, or a maximum number of Ethernet addresses reachable via the UE.

Example 20 includes the one or more computer-readable media of example 14 or some other example herein, wherein the message is generated via a policy control function (PCF).

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, and/or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a method of communicating in a wireless network as shown and described herein.

Example 27 may include a system for providing wireless communication as shown and described herein.

Example 28 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. An access node (AN), comprising:
memory to store configuration parameters for configuring a user equipment (UE) for a fifth-generation (5G) local area network (LAN) service, wherein the configuration parameters include: a data network name (DNN) to access a private network and an authorized quality of service (QoS) parameter; and
processing circuitry, coupled with the memory, to:
retrieve the configuration parameters from the memory;
generate a message that includes the configuration parameters; and
encode the message for transmission to the UE via non-access stratum (NAS) signaling.

2. The AN of claim 1, wherein the configuration parameters further include a time of service activation.

3. The AN of claim 1, wherein the configuration parameters are to configure the UE for the 5G LAN service for Internet protocol (IP) communication.

4. The AN of claim 3, wherein the configuration parameters further include: credentials to authenticate with the private network, an IP address or prefix, a domain name service (DNS) server name or address, a support indicator for dynamic DNS, a dynamic host configuration protocol (DHCP) server address, or a proxy call session control function (P-CSCF) address.

5. The AN of claim 1, wherein the configuration parameters are to configure the UE for the 5G LAN service for Ethernet communication.

6. The AN of claim 5, wherein the configuration parameters further include: an indication of support for an Institute of Electrical and Electronics Engineers (IEEE) 802.1Q operation to provide access to virtual networks and QoS support, an IEEE 802.1Q virtual LAN identifier (VID) tag for a virtual network associated with the DNN, a generic public subscription identifier (GPSI) or subscription permanent identifier (SUPI) associated with the IEEE 802.1Q VID tag, an indication of address resolution protocol (ARP) support in the private network, or a maximum number of Ethernet addresses reachable via the UE.

7. The AN of claim 1, wherein the message is generated via a policy control function (PCF).

8. One or more computer-readable media storing instructions that, when executed by one or more processors, cause a user equipment (UE) to:
receive a configuration message that includes configuration policies to configure the UE for a fifth-generation (5G) local area network (LAN) service, wherein the configuration policies include: a data network name (DNN) to access a private network and an authorized quality of service (QoS) parameter; and
perform the 5G LAN service based on the configuration policies.

9. The one or more computer-readable media of claim 8, wherein the configuration policies further include a time of service activation.

10. The one or more computer-readable media of claim 8, wherein the configuration policies are to configure the UE for the 5G LAN service for Internet protocol (IP) communication.

11. The one or more computer-readable media of claim 10, wherein the configuration policies further include: credentials to authenticate with the private network, an IP address or prefix, a domain name service (DNS) server name or address, a support indicator for dynamic DNS, a dynamic host configuration protocol (DHCP) server address, or a proxy call session control function (P-CSCF) address.

12. The one or more computer-readable media of claim 8, wherein configuration policies are to configure the UE for the 5G LAN service for Ethernet communication.

13. The one or more computer-readable media of claim 12, wherein the configuration policies further include: an indication of support for an Institute of Electrical and Electronics Engineers (IEEE) 802.1Q operation to provide access to virtual networks and QoS support, an IEEE 802.1Q virtual LAN identifier (VID) tag for a virtual network associated with the DNN, a generic public subscription identifier (GPSI) or subscription permanent identifier (SUFI) associated with the IEEE 802.1Q VID tag, an indication of address resolution protocol (ARP) support in the private network, or a maximum number of Ethernet addresses reachable via the UE.

14. One or more computer-readable media storing instructions that, when executed by one or more processors, cause an access node (AN) to:
generate a message that includes configuration parameters to configure a user equipment (UE) for a fifth-generation (5G) local area network (LAN) service, wherein the configuration parameters include: a data network name (DNN) for accessing a private network and an authorized quality of service (QoS) parameter; and
encode the message for transmission to the UE via non-access stratum (NAS) signaling.

15. The one or more computer-readable media of claim 14, wherein the configuration parameters further include a time of service activation.

16. The one or more computer-readable media of claim 14, wherein the configuration parameters are to configure the UE for the 5G LAN service for Internet protocol (IP) communication.

17. The one or more computer-readable media of claim 16, wherein the configuration parameters further include: credentials to authenticate with the private network, an IP address or prefix, a domain name service (DNS) server name or address, a support indicator for dynamic DNS, a dynamic host configuration protocol (DHCP) server address, or a proxy call session control function (P-CSCF) address.

18. The one or more computer-readable media of claim 14, wherein configuration parameters are to configure the UE for the 5G LAN service for Ethernet communication.

19. The one or more computer-readable media of claim 18, wherein the configuration parameters further include: an indication of support for an Institute of Electrical and Electronics Engineers (IEEE) 802.1Q operation to provide access to virtual networks and QoS support, an IEEE 802.1Q virtual LAN identifier (VID) tag for a virtual network associated with the DNN, a generic public subscription identifier (GPSI) or subscription permanent identifier (SUPI) associated with the IEEE 802.1Q VID tag, an indication of address resolution protocol (ARP) support in the private network, or a maximum number of Ethernet addresses reachable via the UE.

20. The one or more computer-readable media of claim 14, wherein the message is generated via a policy control function (PCF).

* * * * *

UNITED STATES PATENT AND TRADEMARK OFFICE
CERTIFICATE OF CORRECTION

PATENT NO. : 11,743,231 B2
APPLICATION NO. : 17/268377
DATED : August 29, 2023
INVENTOR(S) : Stojanovski et al.

Page 1 of 1

It is certified that error appears in the above-identified patent and that said Letters Patent is hereby corrected as shown below:

In the Claims

In Column 27, Claim 12, Line 43, after 'wherein' insert -- the --.

In Column 28, Claim 13, Line 3, delete "(SUFI)" and insert -- (SUPI) --, therefor.

In Column 28, Claim 18, Line 33, after 'wherein' insert -- the --.

Signed and Sealed this
Tenth Day of October, 2023

Katherine Kelly Vidal
*Director of the United States Patent and Trademark Office*